Patented July 4, 1944

2,352,980

UNITED STATES PATENT OFFICE 2,352,980

ISOPRENE-CYCLOPENTADIENE COPOLYMERS

Frank J. Soday, Upper Darby, Pa., assignor to The United Gas Improvement Company, a corporation of Pennsylvania No Drawing. Application July 6, 1939, Serial No. 283,058

13 Claims. (Cl. 260—23)

This invention relates to new compositions of matter and to methods for their preparation.

More particularly, this invention pertains to resins resulting from reacting cyclopentadiene with isoprene.

It is an object of this invention to provide a new type of synthetic resin. It is a further object of this invention to provide a resin having utility in industrial fields, and particularly in the liquid coating composition field.

More particularly, it is an object of this invention to provide varnish and lacquer resins possessing excellent alkali, acid, and water resistant properties.

Still another object of this invention is to provide resins the color of which may be readily controlled and varied.

A still further object of the invention is to provide resins compatible with a wide variety of additive agents such as decorative constituents, pigments, softening agents, plasticizers, and the like.

Another object of the invention is to provide a process for preparing resins of the above character.

Still other objects will become more apparent to those skilled in the art from the following description and illustrative examples.

This invention is based upon the discovery that a new synthetic resin having highly desirable properties may be prepared by the reaction of cyclopentadiene with isoprene.

The isoprene employed in the preparation of my new resins may be obtained from any suitable source.

For instance, it may be obtained by a variety of synthetic methods, or it may be obtained by the fractionation of condensates obtained in the manufacture of carburetted water gas, oil gas, refinery gas, or coke oven gas, or from similar sources. Such fractions will be referred to herein generally as light oil isoprene fractions. Fractions obtained in the manufacture of oil gas are particularly preferred.

The isoprene employed may be in solution in an inert solvent, or it may be in the form of a technical hydrocarbon fraction, which may also contain smaller quantities of other diolefines, for example piperylene. In fact, such fraction may contain cyclopentadiene.

In general, the presence of small quantities of olefines in the reaction mixture results in the production of resins having a lower melting point.

The cyclopentadiene used in the preparation of my new resin may be in the form of pure or commercially or technically pure cyclopentadiene, or in the form of a light oil hydrocarbon fraction of any desired concentration, in which case the fraction may also contain isoprene, and piperylene.

At least substantially pure cyclopentadiene is preferred.

I prefer that the dicyclopentadiene content of the cyclopentadiene used in the preparation of my new resins be low, and in any event less than 5% of the cyclopentadiene content. Excellent results are obtained by the use of cyclopentadiene fractions of from 95–100% purity.

Cyclopentadiene may be freed from dicyclopentadiene by distillation.

The polymerization of the mixture of reactants may be effected in any desired manner, although polymerization by means of catalysts, such as the metallic halides (which term includes the boron halides) and particularly metallic halide-organic solvent complexes is preferred. The metallic halides employed in my invention are characterized by their tendency to hydrolyze in the presence of water, giving an acid reaction. For convenience, this well-known class of catalysts may therefore be designated as acid-acting metallic halides. The term "acid-acting metallic halide catalyst" as used in the specification and claims is intended to include not only the acid-acting metallic halides (including the boron halides) but also complexes thereof.

Examples of such complexes are boron trifluoride-organic solvent complexes, such as boron trifluoride-diethyl ether complexes, aluminum chloride-organic solvent complexes, such as aluminum chloride-diethyl ether complex, aluminum bromide-organic solvent complexes, such as aluminum bromide-nitrobenzene complex, stannic chloride-organic solvent complexes, such as stannic chloride-phenyl methyl ether complex, boron trichloride-organic solvent complexes, such as boron trichloride-dimethyl ether complex, zinc chloride-organic solvent complexes, such as zinc chloride-pentene complex, and ferric chloride-organic solvent complexes, such as ferric chloride-phenyl ethyl ether complex.

The preparation of a complex of this character in general comprises adding a metallic halide to a solvent with agitation. As a result, if a chemical reaction takes place between the metallic halide and the solvent, a definite chemical compound is formed.

The complex catalysts are preferably employed in the form of suspensions, emulsions, or solutions in organic solvents, of which benzene, toluene, solvent naphtha, and petroleum naphtha are examples.

Examples of other catalysts are the organic peroxides such as benzoyl peroxide and pinene peroxide; mineral acids, such as sulfuric and phosphoric acids; mineral acid-organic solvent mixtures such as sulfuric acid-diethyl ether mixture and sulfuric acid-dioxan mixture; active metals such as sodium or potassium; contact materials such as clay, activated clay, activated carbon, silica gel, fuller's earth, diatomaceous earth, and alumina; ultra violet light; and ultra sonics.

Two or more of the foregoing catalysts might be employed.

I have discovered that isoprene and cyclopentadiene may be co-polymerized into at least two broad types of co-polymers, one of which is characterized by being soluble in solvents such as benzene and toluene, while the other is characterized by being insoluble in these solvents.

The soluble type of co-polymer is at the present time the more valuable, among other things, because a resin may be utilized much more readily when it can be brought into solution.

Furthermore, my soluble type of isoprene-cyclopentadiene co-polymer posseses certain unique characteristics which are not shared by the insoluble type.

Generally speaking, the soluble type of co-polymer is produced by a careful control of the co-polymerization reaction in a manner to prevent the co-polymerization conditions from becoming too drastic.

There are at least four factors which influence production of soluble co-polymer. These four factors are (1) temperature, (2) total concentration of combined isoprene and cyclopentadiene, (3) proportion of catalyst to combined isoprene and cyclopentadiene, and (4) reaction time.

Generally speaking, higher values in each of these four items results in more drastic co-polymerization conditions, whereas lower values generally speaking, result in less drastic conditions.

Furthermore, and also generally speaking, the effect of a higher value in any one item may be off-set by a sufficiently low value in any one or more of the other items.

In other words, there appears to be a threshold in drasticity below which the soluble type of co-polymer is obtained substantially exclusively and above which at least some insoluble co-polymer begins to appear.

When exceeding threshold conditions to a greater extent, insoluble co-polymer is formed exclusively.

The band over which both soluble and insoluble co-polymers are formed varies in width with change in conditions.

Furthermore, the exact set of conditions of (1) temperature, (2) total concentration of combined isoprene and cyclopentadiene, (3) proportion of catalyst to combined isoprene and cyclopentadiene, and (4) reaction time at which insoluble co-polymer begins to appear, may vary somewhat with change in purity or source of isoprene, or of cyclopentadiene, or of catalyst, or of solvent, or with a change in catalyst, or in solvent.

Therefore, while exact values of each of these four items at which polymerization conditions would be sufficiently drastic to correspond to threshold conditions may be readily determined by test for any given set of co-polymerization conditions which are otherwise held fixed, such data is not essential to the operator, for should an insoluble co-polymer or gel be produced when a soluble non-gelled co-polymer is desired, it is merely necessary to sufficiently reduce one or more of the four items, namely, (1) temperature, (2) total concentration of combined isoprene and cyclopentadiene, (3) proportion of catalyst to combined isoprene and cyclopentadiene, and (4) reaction time, until the desired soluble co-polymer is obtained.

Moreover, it is to be very definitely understood that it is unnecessary to operate at or near threshold conditions to obtain the soluble type of co-polymer. In fact, the more desirable soluble co-polymers are obtained while maintaining reaction conditions substantially below threshold conditions.

Even under such conditions, each of the four items mentioned is subject to considerable variation, particularly since a higher value in one may be off-set by a sufficiently low value in another, and since the total drasticity is subject to considerable variation.

Subject to the foregoing, the quantity of catalyst may be varied over a rather wide range, although it is found preferable to employ limited quantities such as from 0.1% to 10% by weight of total reactants present. The proportion of catalyst to combined isoprene plus cyclopentadiene preferably should rarely exceed 20% by weight.

Also subject to the foregoing, considerable variation in temperature is permissible. However, when employing metallic halides or metallic halide-organic solvent complexes as catalysts, the polymerizing temperature preferably should rarely exceed 100° C., and preferably should not exceed 70° C. In general, polymerizing temperatures between —60 and 100° C. are suitable. I prefer, however, to use temperatures between —40 and 60° C.

Also subject to the foregoing, the total concentration of reactants is subject to wide variation but preferably should rarely exceed 80% by weight of the total solution. Between 20% and 40% may be regarded as a good average example.

Lastly, and also subject to the foregoing, the reaction time is subject to considerable variation. I find, however, that for good yields sufficient time preferably is allowed for at least the preponderant part of the materials to be adequately contacted to permit them to react. Constant agitation is very helpful in this respect.

While normally the cyclopentadiene and isoprene enter the reaction in an unpolymerized state, if desired, and as a variation, either compound may be added to the polymerizing vessel first and partially polymerized to any desired extent prior to the addition of the other compound in monomeric form or in partially polymerized form.

Preferably, however, such prior partial polymerization of either or both compounds when resorted to is effected by means of a catalyst or catalysts instead of heat only. In other words, it is preferred that substantial quantity of partial heat polymers be not present.

If desired, the reactants may be employed in admixture with additives such as coloring materials, softeners, plasticizers, and the like. Also, if desired, the reaction may be carried out in the emulsion state by the use of a suitable emulsifying agent, such as sodium oleate.

In order to control more closely the speed and uniformity of the reaction, I may slowly add, with thorough agitation, a solution of the reactants to a suspension, solution or emulsion of the catalyst in an organic solvent. However, if desired, the catalyst as such, or in suspension, solution, or emulsion form, may be slowly added to the reactants, or to a solution or emulsion containing the same.

Examples of suitable solvents or diluents for both catalysts and reactants are benzene, toluene, xylene, solvent naphtha, petroleum naphtha, and carbon tetrachloride.

In any event, the addition of one material to the other is preferably accompanied by thorough stirring which is preferably rapid to insure uniform distribution of both materials and temperature.

In addition, the reaction is preferably carried out in apparatus capable of adequate temperature control such as a jacketed vessel provided with an agitator.

In general, it is preferred to completely remove the catalyst from the reaction mass after the desired polymerization is obtained.

Metallic halides, metallic halide-organic solvent complexes and organic peroxides may be removed by any suitable means, such as treating the reaction mass with an alkaline solution, followed by thorough washing with water, and filtration.

Contact materials may be removed from the reaction mass by settling, filtration, or centrifuging, or otherwise.

While in accordance with my invention cyclopentadiene and isoprene may be reacted in any desired relative proportion, the relative proportion of cyclopentadiene to isoprene reflects itself in the properties of the resultant resinous compounds to a considerable extent.

For example, the product obtained by reacting 80 parts of cyclopentadiene with 20 parts of isoprene results in a resinous compound which is particularly suitable for the production of spirit varnishes.

On the other hand, a resin resulting from reacting 20 parts of cyclopentadiene with 80 parts of isoprene is particularly suitable for the production of oil varnishes, paints, or enamels.

In general, an excess of cyclopentadiene results in a polymer more suited to the production of spirit varnishes, while an excess of isoprene results in a polymer more suited to the production of varnishes containing drying oils, such as linseed oil, China-wood oil, perilla oil, fish oil, and the like.

By a suitable choice of the proportion of cyclopentadiene and isoprene in the charging stock, resins having a variety of properties may be secured.

Other factors which will have a modifying influence upon the polymer obtained are the manner in which the polymerization is conducted, the concentration and relative purity of the materials undergoing polymerization, the nature and quantity of catalyst employed, temperature range, reaction time, and the like.

For example, and as above pointed out, drastic conditions with respect to temperature, the concentration of reactants, the proportion of catalyst, and the reaction time, may result in insoluble polymers or gels instead of the more desirable soluble resins.

The following examples will serve to further illustrate the invention.

EXAMPLE 1

To a mixture of 50.1 parts of cyclopentadiene and 49.9 parts of isoprene in the form of a light oil fraction containing 65% isoprene was added sufficient toluene to reduce the total diolefine concentration to 20% by weight. Approximately 2% by weight of boron-trifluoride diethyl ether complex was used as a catalyst, based on the total weight of the reaction mixture. The mixture of reactants was added to the catalyst, at a temperature of −20° C., after which the reaction was continued for an additional period of 18 hours at this temperature. At the end of this period the catalyst was hydrolyzed with water and the reaction mixture was then allowed to come up to room temperature. The resinous solution was dried over lime and filtered. The yield of resin was 85.7% by weight of the diolefines used in the process. The resin was light yellow in color.

EXAMPLE 2

A mixture of 151.4 grams of cyclopentadiene, and 63.3 grams of isoprene, in the form of a 94.8% light oil isoprene fraction (actual diolefine concentration of the mixture=cyclopentadiene=71.6%, isoprene=28.4%) was added with agitation during 10 minutes at 25° C. to 600 grams of toluene and 1 cc. of boron trifluoride-diethyl ether complex. The mixture was agitated at a temperature of 25–30° C. for three hours, then hydrolyzed during a period of one hour with 2 cc. of water, after which the mixture was agitated with 10 grams of quicklime for two hours. A 25 gram portion of a filter aid known commercially as Celite was then added to the reaction mixture, and the whole filtered. A yield of 76.6% by weight of a light yellow resin was obtained.

EXAMPLE 3

A mixture of 183.8 grams of cyclopentadiene, and 31.7 grams of isoprene, in the form of a 94.8% light oil isoprene fraction (actual diolefine concentration of the mixture=cyclopentadiene=85.9%, isoprene=14.1%) was added with agitation during ten minutes at 25° C. to 600 grams of toluene and 1 cc. of boron trifluoride-diethyl ether complex. The mixture was agitated at a temperature of 25–30° C. for three hours, then hydrolyzed during a period of one hour with 2 cc. of water, after which the mixture was agitated with 10 grams of quicklime for two hours. A 25 gram portion of a filter aid known commercially as Celite was then added to the reaction mixture, and the whole filtered. A yield of 81.5% by weight of a light yellow resin was obtained.

While in the foregoing description reference has not been expressly made to a change in polymerization agent during the polymerization step, it is to be understood that a change in polymerization agent during the polymerization step might be made, if desired.

For instance, the reactants may be initially polymerized in part by the use of a catalyst such as aluminum chloride-diethyl ether complex, the catalyst removed, and the polymerization completed by the addition of a second catalyst, such as clay.

Other combinations may be employed.

I prefer to carry out the polymerization in the presence of an inert and preferably non-catalytic gas, such as carbon dioxide, or nitrogen, or in the presence of solvent vapors, or vapors of the reaction mass, or in a vacuum. In general, the exclusion of air or oxygen from the material during the polymerization process will prevent the formation of undesirable compounds, although this step is by no means essential.

Furthermore, while it is preferred to carry out the polymerization with the reactants at least for the most part in the liquid phase, it is to be understood that the reactants might be in the gaseous phase or partly in the gaseous phase and partly in the liquid phase, or one or more of the reactants might be in the form of an emulsion.

While, as previously pointed out, any proportion of cyclopentadiene to isoprene may be employed, but I prefer in the case of resins for use in coating compositions containing drying oils, such as paints and varnishes, to employ between 50 and 99% isoprene on the undiluted basis to between 1 and 50% cyclopentadiene on the undiluted basis. 60 to 90% isoprene to 40 to 10% cyclopentadiene is very suitable.

The resin obtained by polymerizing a mixture containing 80 parts of isoprene to 20 parts of cyclopentadiene is excellent.

On the other hand, in the case of resins for use in coating compositions essentially free of drying oils, such as spirit varnishes and lacquers, I prefer to employ between 50 and 99% cyclopentadiene to between 50 to 1% isoprene on the undiluted basis. 70 to 95% cyclopentadiene to 30 to 5% isoprene is very suitable.

The resin obtained by polymerizing a mixture containing 90 parts of cyclopentadiene to 10 parts of isoprene is excellent.

My new resins may be prepared in many desirable color combinations.

Color may be obtained either naturally or artificially.

Natural colors may be secured by varying the source and quality of either the cyclopentadiene or the isoprene, or both.

Artificial colors and color combinations may be produced through the addition to my new resins of suitable chemical compounds.

Coloring materials, such as organic dyes, inorganic dyes, pigments, and lakes, may be added to any one or more of the reactants, or to the reaction mixture at any stage, but preferably prior to complete polymerization.

As a rule, organic dyes and other organic coloring bodies produce resins with pastel shades.

If desired, the coloring material itself may be prepared in situ by adding the necessary materials to the polymerization reaction.

As an example, a short list of suitable coloring materials is given in the following table.

Table I

| Color | Dye group |
|---|---|
| Orange | Mono azo. |
| Yellow | Do. |
| Green | Triphenylmethane. |
| Heliotrope | Triphenylmethane pyronine. |
| Red | Pyronine. |
| Black | Diphenyl amine. |

Attention is directed to the fact that certain coloring materials may also act as catalysts or as inhibitors to the polymerization reaction. Accordingly, coloring materials should be selected as to (1) their inertness, (2) their action as catalysts, and (3) their action as inhibitors in order to in order to obtain the desired result. In this connection, inhibitors may be employed to retard an otherwise too hasty reaction.

A proper choice of polymerizing conditions will enable almost any type of coloring material to be used.

A decorative filler functioning very much on the order of a coloring material may be added, with or without other coloring matter. Examples of decorative fillers are pearl essence, flaked mercurous chloride, and chitin extracts.

Furthermore, other agents such as softeners, plasticizers, and the like, may also be added at any stage of the polymerization process.

When a spirit varnish or lacquer is to be prepared from my new resins the reaction mass may be neutralized, clarified, and employed as such, since solvent is usually already present, or other ingredients, such as other solvents, plasticizers, other resinous materials, and the like may be added. If desired, the solvent employed in the polymerizing step may be replaced, in whole or in part, by another solvent, or a mixture of solvents. On the other hand, all solvent present might be removed and the concentrated resin may be employed in the compounding of the desired coating composition.

When my new resins are to be employed in the preparation of coating compositions containing drying oils, it is desirable to remove the solvent from the resin before incorporating it in such coating compositions. This can be accomplished in any desired manner, such as by steam distillation under reduced pressure.

The incorporation of an isoprene-cyclopentadiene resin, prepared as in Example 1, in a standard varnish formulation is illustrated in the following example.

EXAMPLE 4

Formula

| | Parts |
|---|---|
| Isoprene-cyclopentadiene resin | 12.2 |
| China-wood oil | 14.0 |
| Solvent naphtha (V. M. and P.) | 26.2 |
| Drier | 1.0 |

The mixture of resin and China-wood oil is heated in a copper vessel to a temperature of 400° F. during a period of ten minutes. The mixture then is heated to a temperature of 560° F. during a period of five minutes, and held at this temperature for an additional period of one minute. It is allowed to cool to 535° F., held at this temperature for a period of three minutes, chilled to 400° F., and reduced with solvent naphtha. The drier is stirred into the varnish when it reaches room temperature.

The product is a clear, light colored varnish with excellent coating properties.

It is a well recognized fact that a tin coating for metal food containers is, in many instances, unsatisfactory even though the containers are heremetically sealed. In the case of grape juice, for instance, tin is dissolved on long standing to degrade the product and should the smallest hole develop in the tin lining, a reaction is set up which soon finds its way to the outer surface of the can, thus causing it to leak.

It is the custom after a can has been sealed to subject it and its contents to a sterilization treatment with heat. This increased temperature greatly accelerates any reactions that are capable of taking place.

The introduction of the sealed can in the beverage trade has increased enormously the demand for a completely inert lining incapable of modifying the taste of the beverage. This applies particularly in the case of beer.

As a result of the foregoing, the art has sought to find a lacquer which might be applied over or substituted for the tin coating. It was found, however, that lacquers generally either failed to form a suitable bond with the metal surface so as to adhere firmly thereto, or if a proper bond was formed the lacquer film failed to resist reaction with foods.

Since it is desirable to apply the lacquer coating to the sheet metal before the can or other object is made up, the bonding properties of the lacquer must be such as to withstand bending, pressing, shaping, stamping, and so forth, without cracking or losing adhesion.

In addition to the foregoing, the lacquer coating must have an acceptable appearance preferably suggesting utmost cleanliness. This is because the usual housewife looks with great disfavor upon any discoloration of the inside surface of a can when removing food therefrom.

The lacquer also should be completely odorless and tasteless in order not to impair the flavor or odor of the canned food product in any way.

Satisfactory surface films may be produced by applying to surfaces in general and metal surfaces such as tin and iron in particular a liquid coating composition having as a base my new resin, and then baking or air-drying the coating thus applied or permitting it to dry in any other atmosphere.

Such films also show excellent alkali, acid, and water resistance which is highly desirable in the case of food containers.

Such liquid coating compositions may be made by dissolving my resins in volatile solvents or by incorporating my resins in varnishes, lacquers, or the like. The adherence to the material is unusually tenacious as shown by the following example.

EXAMPLE 5

A solution of isoprene-cyclopentadiene co-polymer obtained as in Example 2 was used as a spirit varnish in the coating of tin-coated steel panels, such as those used for the fabrication of food and beverage containers. The panels were dipped into the resinous solution, after which they were baked at 180° C. for a period of fifteen minutes. Coating weights of 4.3 milligrams per square inch were thus obtained.

One of these panels was sterilized with live steam under a pressure of fifteen pounds per square inch, after which the coating was crosshatched in a diamond pattern, the lines extending completely through the resinous coating. The panel was sharply bent over a ⅛" mandrel through an angle of 180°, after which a piece of Scotch adhesive tape was firmly affixed to the cross-hatched section and then suddenly stripped from the surface. None of the resinous coating was removed from the panel by this procedure, which shows the unusual adhesive properties of the material.

The test was repeated after a storage period of three months, with the same results, which illustrates the excellent aging properties of the resinous material.

The use of my new resin is by no means restricted to the formation of a single film system. For instance, it may be used as a primer coat for another resinous coating compound of lesser bonding qualities, for example, the polymerized vinyl compounds, such as the vinyl chloride-vinyl acetate co-polymers an example of which is the product known commercially as vinylite, representative of which is a co-polymer of 85% vinyl chloride and 15% vinyl acetate. This applies particularly in the case of metal food or beverage containers, and metal foil wrappers for foodstuffs. On the other hand, if desired, it may be used as a top coat applied over some other primer coating, or it may be employed for both the primer coat and the top coat. A single coat, however, is generally sufficient.

In addition, my resin may be used for coating other materials such as wood, fiber board, asbestos, ceramic ware, concrete, brick, and other building materials.

While, in the preparation of my new resins, it is preferred to have both the catalyst and the reactants in diluted form, it is to be understood that any other procedure might be followed without departing from the broad concept of the invention. For instance, all of the diluent may be first mixed with either the catalyst or the reactant, or reactants, leaving the other in concentrated form. Or the larger part of the diluent may be added to one, thus leaving the other relatively concentrated. On the other hand, both the catalyst and the reactant or reactants might be employed in concentrated form, particularly if the observations herein with respect to (1) proportion of catalyst, (2) temperature, and (3) reaction time are followed.

It will be understood that any other suitable alkali, such as sodium hydroxide, sodium carbonate, sodium bicarbonate, magnesium hydroxide, an amine or other basic substance might be substituted for lime in the removal of catalyst, preferably followed by a non-acidic drying agent such as sodium sulphate or soda lime. Both neutralizing and drying is effected by lime. Neutralization is preferably followed by filtration, centrifuging or settling to remove extraneous solids.

While I have spoken rather disparagingly of the insoluble type of resin, this is because it is also generally infusible and, therefore, has few if any important uses at the present time. Should an important use develop for a resin which is insoluble and infusible before use, my process may likewise be used to obtain this material in good yield by employing drastic conditions as to (1) concentration of reactants, (2) concentration of catalyst, (3) temperature, and (4) reaction time.

While the invention has been particularly described in connection with the polymerization of cyclopentadiene with isoprene, it is to be understood that cyclopentadiene might be replaced in whole or in part by methyl cyclopentadiene. However, it is to be understood that the polymers particularly described have certain unique characteristics which distinguish them from polymers prepared from other starting materials.

The term "benzene-soluble" is employed in the claims to indicate solubility characteristics of the copolymer, and is not intended to imply the actual presence or absence of benzene.

It is to be understood that the above particular description is by way of illustration and that changes, omissions, additions, substitutions, and/or modifications might be made within the scope of the claims without departing from the spirit of the invention which is intended to be limited only as required by the prior art.

I claim:

1. A process for the co-polymerization of cyclopentadiene and isoprene, comprising reacting cyclopentadiene which is relatively free from dicyclopentadiene with isoprene in the presence of an acid-acting metallic halide-organic solvent complex as catalyst, while maintaining the temperature throughout the reaction mass not in excess of 100° C., the concentration of reactants not in excess of 80% by weight, the proportion of catalyst to reactants not in excess of 20% by weight, and stopping the reaction while benzene-soluble polymer is present in the reaction mass.

2. A process for the co-polymerization of cyclopentadiene and isoprene, comprising reacting cyclopentadiene which is free from more than 5% dicyclopentadiene with isoprene in the presence of an acid-acting metallic halide catalyst, while maintaining the temperature throughout the reaction mass between —40° and 60° C., the concentration of reactants between 20 and 40% by weight, the proportion of catalyst to reactants not in excess of 10% by weight, and stopping the reaction while benzene-soluble polymer is present in the reaction mass.

3. Benzene-soluble copolymer of isoprene with at least one of a group consisting of cyclopentadiene and methyl cyclopentadiene, the copolymer molecule being substantially free from other than diolefine components.

4. Benzene-soluble copolymer of isoprene with cyclopentadiene, the copolymer molecule being substantially free from other than diolefine components.

5. Benzene-soluble copolymer of isoprene with methyl cyclopentadiene, the copolymer molecule being substantially free from other than diolefine components.

6. Benzene-soluble copolymer of isoprene with cyclopentadiene, the polymerization being effected in the absence of a greater proportion of dicyclopentadiene than 5% by weight of said cyclopentadiene, said copolymer molecule being substantially free from other than diolefine components.

7. Benzene-soluble copolymer of isoprene with cyclopentadiene, said copolymer resulting from the polymerization of from 60 to 90% isoprene with from 40 to 10% cyclopentadiene in the absence of a greater proportion of dicyclopentadiene than 5% by weight of said cyclopentadiene, said copolymer molecule being substantially free from other than diolefine components.

8. Benzene-soluble copolymer of isoprene and cyclopentadiene produced by copolymerizing from 70 to 95% cyclopentadiene with from 30 to 5% isoprene in the absence of a greater proportion of dicyclopentadiene than 5% by weight of said cyclopentadiene, said copolymer molecule being substantially free from other than diolefine components.

9. A varnish comprising the copolymer of claim 7 incorporated in a drying oil.

10. A spirit varnish comprising the copolymer of claim 8 admixed with a volatile solvent.

11. In a process for the copolymerization of isoprene with at least one of a group consisting of cyclopentadiene and methyl cyclopentadiene in the presence of a material capable of catalyzing said copolymerization, the steps for controlling said copolymerization to obtain diolefine copolymer which is soluble in benezene comprising maintaining the temperature throughout the reaction mass not in excess of 100° C., the concentration of reactants not in excess of 80% by weight, the proportion of catalyst to reactants not in excess of 20% by weight; and stopping the reaction while benzene-soluble diolefine copolymer is present in the reaction mass.

12. In a process for the copolymerization of isoprene with cyclopentadiene in the presence of a material capable of catalyzing said copolymerization, the steps for controlling said copolymerization to obtain diolefine copolymer which is soluble in benzene comprising maintaining the temperature throughout the reaction mass not in excess of 70° C., the concentration of reactants not in excess of 80% by weight, the proportion of catalyst to reactants not in excess of 10% by weight; and stopping the reaction while benzene-soluble diolefine copolymer is present in the reaction mass.

13. In a process for the copolymerization of isoprene with at least one of a group consisting of cyclopentadiene and methyl cyclopentadiene in the presence of an acid-acting metallic halide catalyst, the steps for controlling said copolymerization to obtain diolefine copolymer which is soluble in benzene comprising maintaining the temperature throughout the reaction mass between —40 and 60° C., the concentration of reactants not in excess of 80% by weight, the proportion of catalyst to reactants not in excess of 10% by weight; and stopping the reaction while benzene-soluble diolefine copolymer is the preponderant polymer present in the reaction mass.

FRANK J. SODAY.